United States Patent
Strelnikoff et al.

(10) Patent No.: US 11,907,307 B1
(45) Date of Patent: Feb. 20, 2024

(54) METHOD AND SYSTEM FOR EVENT PREDICTION VIA CAUSAL MAP GENERATION AND VISUALIZATION

(71) Applicant: HRL Laboratories, LLC, Malibu, CA (US)

(72) Inventors: Sasha Strelnikoff, Seattle, WA (US); Aruna Jammalamadaka, Camarillo, CA (US); Dana M. Warmsley, Thousand Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 35 days.

(21) Appl. No.: 17/859,916

(22) Filed: Jul. 7, 2022

Related U.S. Application Data (60) Provisional application No. 63/219,766, filed on Jul. 8, 2021.

(51) Int. Cl.
 *G06F 16/906* (2019.01)
 *G06N 7/01* (2023.01)

(52) U.S. Cl.
 CPC ............. *G06F 16/906* (2019.01); *G06N 7/01* (2023.01)

(58) Field of Classification Search
 CPC ...... G06F 40/30; G06F 40/289; G06F 16/951; G06F 16/3344; G06F 40/279; G06F 40/20; G06F 16/24575; G06F 16/285; G06F 16/35; G06F 16/367; G06F 40/205
 USPC ........................................................ 707/737
 See application file for complete search history.

(56) References Cited

U.S. PATENT DOCUMENTS

| | | | | |
|---|---|---|---|---|
| 2012/0029908 | A1* | 2/2012 | Takamatsu | G06F 40/30 704/9 |
| 2017/0075872 | A1* | 3/2017 | Tong | E21B 47/00 |

OTHER PUBLICATIONS

S. Strelnikoff, A. Jammalamadaka, and D. Warmsley, "Causal maps for multi-document summarization," Proceedings of the 2020 IEEE International Conference on Big Data, pp. 4437-4445, 2020.

C. Yang, J. Zhang, H. Wang, B. Li, and J. Han, "Neural concept map generation for effective document classification with interpretable structure summarization." In Proceedings of the 43rd International ACM SIGIR Conference on Research and Development in Information Retrieval, 2020, pp. 1620-1632.

T. Falke, C. M. Meyer, and I. Gurevych, "Concept-map-based multi-document summarization using concept coreference resolution and global importance optimization," In Proceedings of the Eighth International Joint Conference on Natural Language Processing (vol. 1: Long Papers), 2017, pp. 801-811.

(Continued)

*Primary Examiner* — Hung T Vy
(74) *Attorney, Agent, or Firm* — TOPE-MCKAY & ASSOCIATES (57) ABSTRACT

Described is a system for producing a causal map from a body of text. The system receives multiple textual documents as input. Pairs of cause-effect phrases are extracted from the textual documents and embedded into a vector space. The embedded data is clustered into clusters using a probabilistic technique. A causal map having nodes and edges is generated from the clusters. Using the causal map, causal connections between clusters are obtained, where each node represents an event and each edge represents a causal relationship between events. The causal map is provided as an interactive graph.

20 Claims, 10 Drawing Sheets

(56) References Cited

OTHER PUBLICATIONS

B. Kemmerer, M. Buche, and V. Narayanan, "Deriving revealed causal maps from non-traditional source documents: Challenges and methodological extensions," in Annual Meeting of the Academy of Management, Washington, DC, 2001, pp. 1-37.

S. Zhao, Q. Wang, S. Massung, B. Qin, T. Liu, B. Wang, and C. Zhai, "Constructing and embedding abstract event causality networks from text snippets," in Proceedings of the Tenth ACM International Conference on Web Search and Data Mining, 2017, pp. 335-344.

A. Gopnik, C. Glymour, D. M. Sobel, L. E., Schulz, T. Kushnir, and D. Danks, "A theory of causal learning in children: causal maps and bayes nets," Psychological review, vol. 111, No. 1, p. 3, 2004.

J. Dunietz, J. G. Carbonell, and L. Levin, "Deepcx: A transition-based approach for shallow semantic parsing with complex constructional triggers," in Proceedings of the 2018 Conference on Empirical Methods in Natural Language Processing, 2018, pp. 1691-1701.

D. Cer, Y. Yang, S.-y. Kong, N. Hua, N. Limtiaco, R. S. John, N. Constant, M. Guajardo-Cespedes, S. Yuan, C. Tar et al., "Universal sentence encoder," arXiv preprint arXiv: 1803.11175, 2018, pp. 1-7.

C. S. Perone, R. Silveira, and T. S. Paula, "Evaluation of sentence embeddings in downstream and linguistic probing tasks," arXiv preprint arXiv: 1806.06259, 2018, pp. 1-15.

M. Golzy and M. Markatou, "Poisson kernel-based clustering on the sphere: Convergence properties, identifiability, and a method of sampling," Journal of Computational and Graphical Statistics, pp. 1-13, 2020.

A. P. Dempster, N. M. Laird, and D. B. Rubin, "Maximum likelihood from incomplete data via the em algorithm," Journal of the Royal Statistical Society: Series B (Methodological), vol. 39, No. 1, pp. 1-22, 1977.

R. Mihalcea and P. Tarau, "Textrank: Bringing order into text," in Proceedings of the 2004 Conference on Empirical Methods in Natural Language Processing, 2004, pp. 404-411.

M. Gruppi, B. D. Horne, and S. Adali, "Nela-gt-2019: A large multi-labelled news dataset for the study of misinformation in news articles," arXiv preprint arXiv: 2003.08444, 2020, pp. 1-5.

M. Golzy, M. Markatou, and A. Shivram, "Algorithms for clustering on the sphere: Advances & applications," in Proceedings of the World Congress on Engineering and Computer Science, vol. 1, 2016, pp. 420-425.

S. Banerjee and A. Lavie, "METEOR: An automatic metric for MT evaluation with improved correlation with human judgements," in Proceedings of the ACL Workshop on Intrinsic and Extrinsic Evaluation Measures for Machine Translation and/or Summarization, pp. 65-72, 2005.

\* cited by examiner

METHOD AND SYSTEM FOR EVENT PREDICTION VIA CAUSAL MAP GENERATION AND VISUALIZATION

CROSS-REFERENCE TO RELATED APPLICATIONS

This is a Non-Provisional Application of U.S. Provisional Application No. 63/219,766, filed in the United States on Jul. 8, 2021, entitled, "Method and System for Event Prediction Via Causal Map Generation and Visualization," the entirety of which is incorporated herein by reference.

BACKGROUND OF INVENTION

(1) Field of Invention

The present invention relates to a system for producing a causal map from a body of text describing observed events and, more specifically, to a system for producing a causal map from a body of text describing observed events to predict effects of the observed events.

(2) Description of Related Art

The rapidly increasing abundance of information being produced globally has required a necessity for an automated method for summarizing large amounts of related information. This procedure is referred to as multi-document summarization. One popular multi-document summarization methodology is known as a concept map. Concept maps are graphical tools which depict information using a directed graph in which each node represents a concept and each edge defines a relationship between concepts.

Concept map-based summarization has been shown to be a valuable tool for downstream tasks, such as document classification (see Literature Reference No. 2 of the List of Incorporated Literature References). However, automatic concept map construction can be an ill-posed problem because there is no restriction on what is allowed as a relation between concepts. A class of concept maps, referred to as causal maps, depict causally related concepts. Causal maps have been shown to be a valuable representation of how humans understand narrative information (see Literature Reference No. 4), therefore restricting concept map edges to causal relationships should increase their efficacy and usability as a document summarization tool. Understanding the causal connections between concepts lends itself to predictions about the future (e.g., stock market fluctuations (see Literature Reference No. 5)) and provides valuable information about how to intervene in a system to bring about desired changes, such as described in Literature Reference No. 6. In Literature Reference No. 6, the authors describe an experiment involving 3- to 4-year-olds in which the children are meant to understand the causal relationship between blocks being placed on a box and music playing. Ultimately, they demonstrated that the causal knowledge related to the music and blocks was what allowed the children to intervene and turn off the music.

Thus, a continuing need exists for a system and method that can aid an entity in understanding the causal relationships expressed in large-scale data and predicting future events given observed causal concepts.

SUMMARY OF INVENTION

The present invention relates to a system for producing a causal map from a body of text describing observed events and, more specifically, to a system for producing a causal map from a body of text describing observed events to predict effects of the observed events. The system comprises one or more processors and a memory having instructions such that when the instructions are executed, the one or more processors perform multiple operations. The system receives a plurality of textual documents as input. Pairs of cause-effect phrases are extracted from the plurality of textual documents. The extracted cause-effect phrases are embedded into a vector space, resulting in embedded data. The embedded data is clustered into a plurality of clusters using a probabilistic technique. A causal map comprising a plurality of nodes and edges is generated from the plurality of clusters. Using the causal map, causal connections between clusters are obtained, wherein each node represents an event and each edge represents a causal relationship between events. The causal map is provided as an interactive graph.

In another aspect, the probabilistic technique generates a set of probabilities for both the plurality of clusters and any linkages between the clusters.

In another aspect, in clustering the embedded data, a mixture model is used to generate the set of probabilities and a plurality of prior probabilities associated with clusters.

In another aspect, extracting pairs of cause-effect phrases comprises extracting semantic cause-effect phrases from each textual document, wherein each cause-effect phrase comprises a cause phrase, a causal connective, and an effect phrase.

In another aspect, the semantic cause-effect phrases are embedded into the vector space such that a similarity between semantic cause-effect phrases is represented by an inner product between vectors corresponding to the semantic-cause effect phrases.

In another aspect, causal language is extracted from a set of new documents related to current events, the extracted causal language from the set of new documents is mapped to the causal map to update the causal map, an updated causal map is output, and areas of the updated causal map which display effects of the current events are highlighted.

In another aspect, the interactive graph is used to predict effects of the observed events.

In another aspect, the interactive graph is used to detect inaccurate causal statements in the textual documents.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for producing a causal map from a body of text describing observed events and, more specifically, to a system for producing a causal map from a body of text describing observed events to predict effects of the observed events. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. S. Strelnikoff, A. Jammalamadaka, and D. Warmsley, "Causal maps for multi-document summarization," Proceedings of the 2020 IEEE International Conference on Big Data, pp. 4437-4445, 2020.
2. C. Yang, J. Zhang, H. Wang, B. Li, and J. Han, "Neural concept map generation for effective document classification with interpretable structure summarization." In Proceedings of the 43$^{rd}$ International ACM SIGIR Conference on Research and Development in Information Retrieval, 2020, pp. 1620-1632.
3. T. Falke, C. M. Meyer, and I. Gurevych, "Concept-map-based multi-document summarization using concept coreference resolution and global importance optimization," In Proceedings of the Eighth International Joint Conference on Natural Language Processing (Volume 1: Long Papers), 2017, pp. 801-811.
4. B. Kemmerer, M. Buche, and V. Narayanan, "Deriving revealed causal maps from non-traditional source documents: Challenges and methodological extensions," in Annual Meeting of the Academy of Management, Washington, D C, 2001.
5. S. Zhao, Q. Wang, S. Massung, B. Qin, T. Liu, B. Wang, and C. Zhai, "Constructing and embedding abstract event causality networks from text snippets," in Proceedings of the Tenth ACM International Conference on Web Search and Data Mining, 2017, pp. 335-344.
6. A. Gopnik, C. Glymour, D. M. Sobel, L. E., Schulz, T. Kushnir, and D. Danks, "A theory of causal learning in children: causal maps and bayes nets," Psychological review, vol. 111, no. 1, p. 3, 2004.
7. J. Dunietz, J. G. Carbonell, and L. Levin, "Deepcx: A transition-based approach for shallow semantic parsing with complex constructional triggers," in Proceedings of the 2018 Conference on Empirical Methods in Natural Language Processing, 2018, pp. 1691-1701.
8. D. Cer, Y. Yang, S.-y. Kong, N. Hua, N. Limtiaco, R. S. John, N. Constant, M. Guajardo-Cespedes, S. Yuan, C. Tar et al., "Universal sentence encoder," arXiv preprint arXiv: 1803.11175, 2018.
9. C. S. Perone, R. Silveira, and T. S. Paula, "Evaluation of sentence embeddings in downstream and linguistic probing tasks," arXiv preprint arXiv: 1806.06259, 2018.
10. M. Golzy and M. Markatou, "Poisson kernel-based clustering on the sphere: Convergence properties, identifiability, and a method of sampling," Journal of Computational and Graphical Statistics, pp. 1-13, 2020.
11. A. P. Dempster, N. M. Laird, and D. B. Rubin, "Maximum likelihood from incomplete data via the em algorithm," Journal of the Royal Statistical Society: Series B (Methodological), vol. 39, no. 1, pp. 1-22, 1977.

12. R. Mihalcea and P. Tarau, "Textrank: Bringing order into text," in Proceedings of the 2004 Conference on Empirical Methods in Natural Language Processing, 2004, pp. 404-411.

13. M. Gruppi, B. D. Horne, and S. Adali, "Nela-gt-2019: A large multi-labelled news dataset for the study of misinformation in news articles," arXiv preprint arXiv: 2003.08444, 2020.

14. M. Golzy, M. Markatou, and A. Shivram, "Algorithms for clustering on the sphere: Advances & applications," in Proceedings of the World Congress on Engineering and Computer Science, vol. 1, 2016, pp. 420-425.

15. S. Banerjee and A. Lavie, "METEOR: An automatic metric for MT evaluation with improved correlation with human judgements," in Proceedings of the ACL Workshop on Intrinsic and Extrinsic Evaluation Measures for Machine Translation and/or Summarization, pages 65-72, 2005.

(2) Principal Aspects

Various embodiments of the invention include three "principal" aspects. The first is a system for producing a causal map from a body of text describing observed events. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
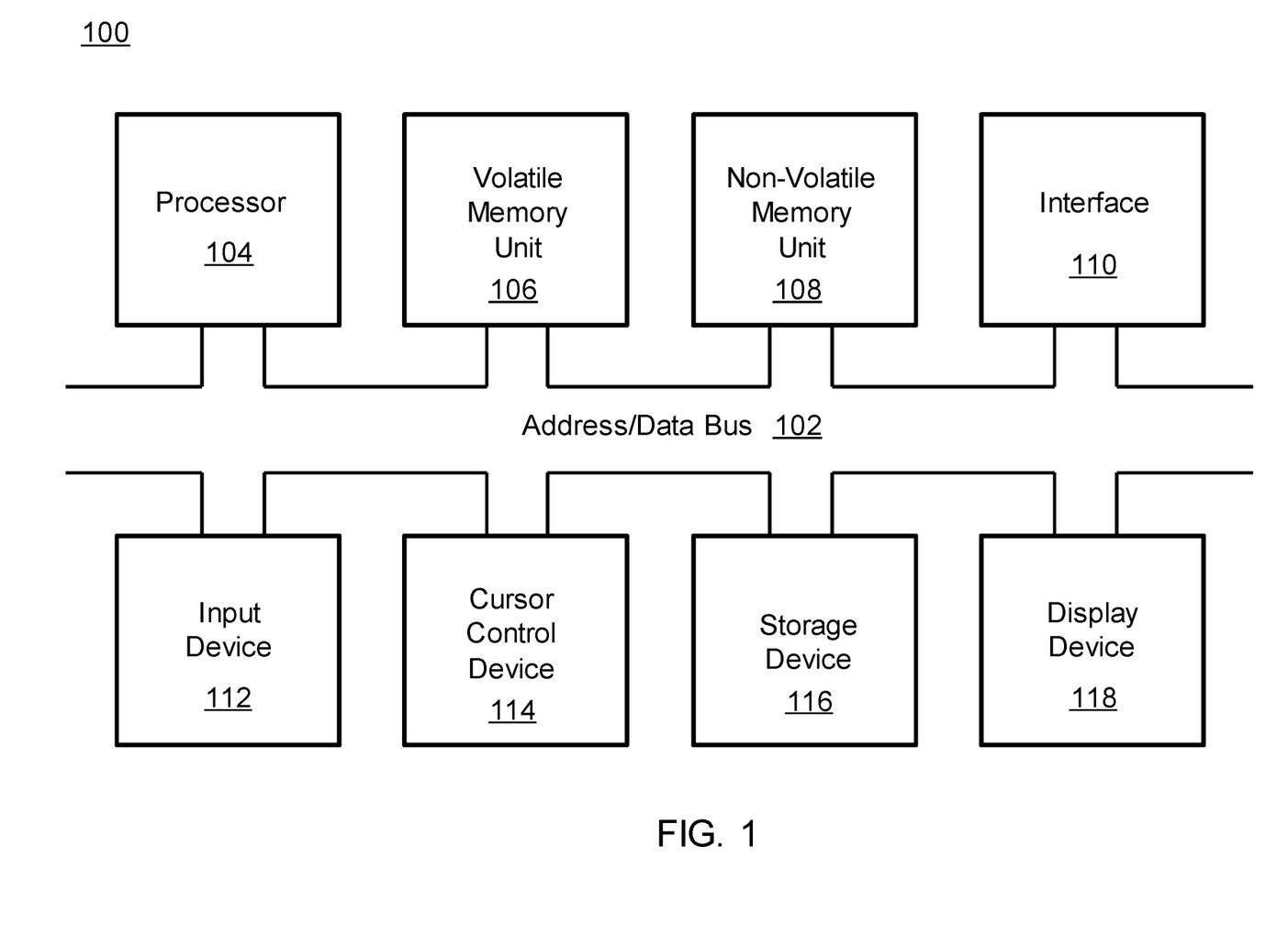
FIG. 1 is a block diagram depicting the components of a system for producing a causal map from a body of text describing observed events according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
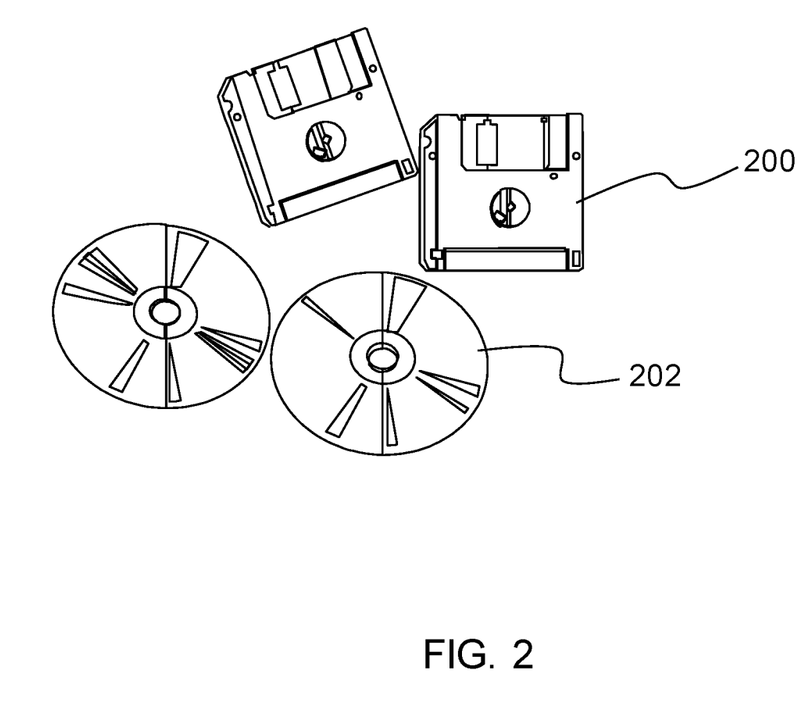
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer and may represent pieces of a whole program or individual, separable, software modules. Non-limiting examples of "instruction" include computer program code (source or object code) and "hard-coded" electronics (i.e., computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments of the Invention

Described is a decision-making tool that predicts the effects of observed events, allowing the user to make an informed decision about optimal actions to take in response to an event. Unique aspects of the tool lie in the causal nature of the prediction, the probabilistic graphical representation, and the unsupervised process through which these are derived from a large document corpus. This unsupervised process extracts causal relationships from relevant text documents, creates a causal map, and visualizes that map for the end user. The tool is able to store the causal maps for future use by an analyst. Given ongoing current events, the user is able to feed in current text documents (e.g., streaming news, social media data sources), and the tool automatically extracts causal concepts (or events) from those new documents, maps the extracted causal concepts to the existing causal map, and highlights areas of the causal map which display the relevant possible effects of those events.

Unlike previous methods, the system described herein is able to derive probabilistic causal maps from a large text corpus in an unsupervised manner. After the end user identifies and inputs relevant text documents, causal language is extracted and then embedded in a vector space. The embedded data is then clustered using a unique probabilistic technique which models cluster linkages simultaneously with modeling the clusters themselves. The final human-interpretable map is then derived by using the modeled probabilities to first prune the edges and then assign specific instances of phrases to the clusters and edges. This map is then visualized as a graph of nodes (events) and edges (causal relationships) for the analyst. The graph is interactive, allowing the end user to explore and/or home in on portions of the graph most relevant to their decision-making process. For instance, the user may prune the edges based on the link priors, show a subset of the terms comprising the clusters to get a sense of the composition of the clusters (perhaps filtering this data to key terms of interest), and toggle various statistics of the cluster distributions.

The present invention aids an entity in understanding the causal relationships expressed in a large corpus of text, and predicting future effects given observed causal concepts. The present invention surpasses correlation-based machine learning prediction models for prediction by leveraging human causal knowledge derived from text. The system described herein is better suited to large-scale data as compared to methods which require a pairwise comparison to be made between each phrase. The probabilistic nature of the invention allows for more customizability, which increases its scope of use as compared to previous methods.

The use of a probabilistic model to derive the concept map has many practical advantages. For example, user input assumptions can be imposed as priors on the distribution of concept instances and the strength of relationships between concepts is naturally modeled. Additionally, the mixture model used is well-suited to large-scale data because the complexity scales linearly with the number of data points (thus, it cannot be done manually and must be done with a specially designed computer program/system). Probabilistic models are also suitable for incremental clustering of new data points, which enables a mapping of causal concepts in streaming news or social media data sources, thereby going beyond the summarization of a static and possibly stale document corpus.

Figure 3:
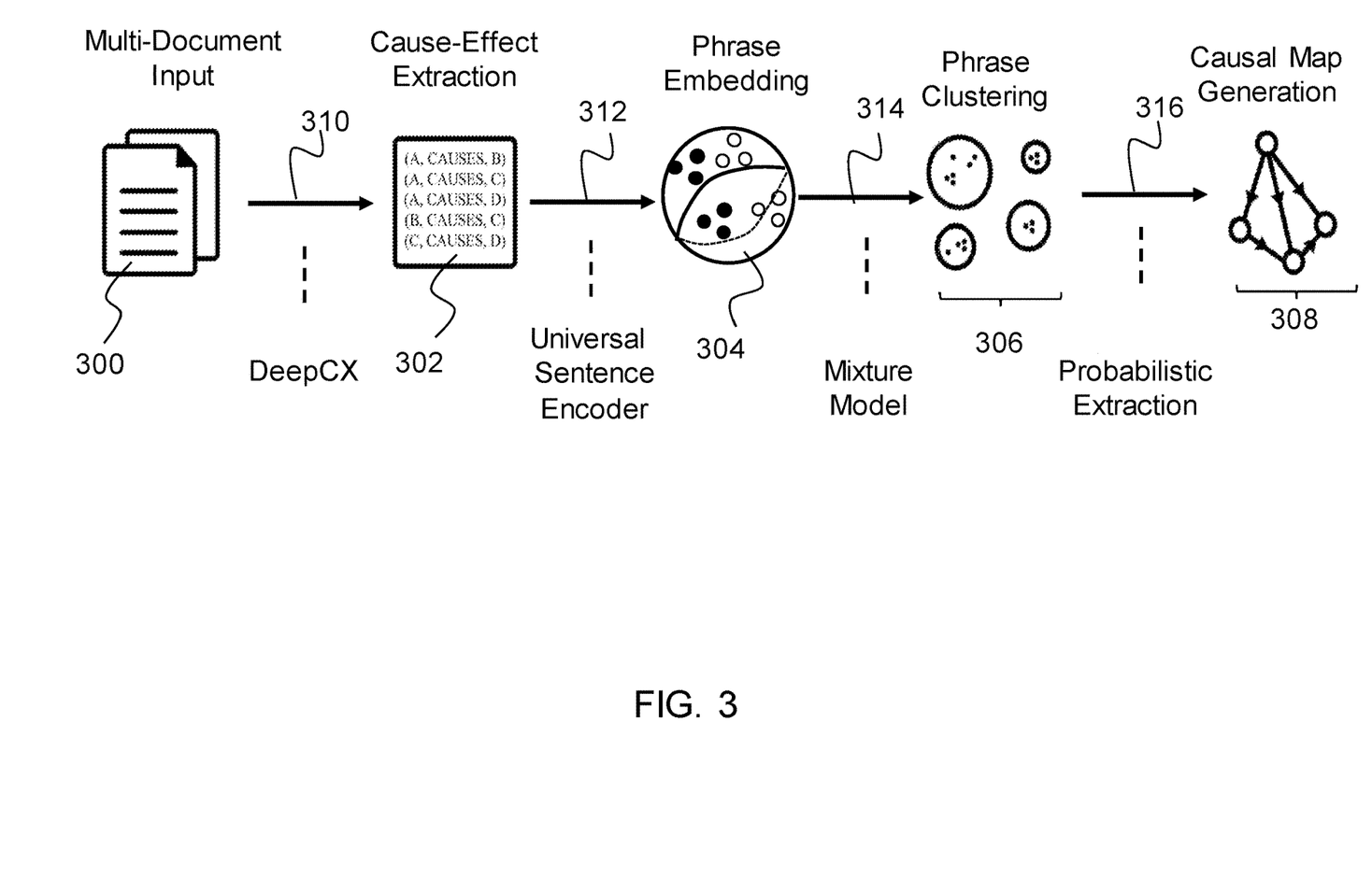
FIG. 3 is an illustration of an unsupervised map generation pipeline according to some embodiments of the present disclosure.

FIG. 3 depicts the unsupervised causal map creation pipeline. First, cause-effect phrase pairs are extracted from a multi-document input 300 during a cause-effect extraction 302. The phrases are then embedded into a high-dimensional vector space (i.e., phrase embedding 304) and clustered (i.e., phrase clustering 306) using the method described herein, which is described in detail below. The phrase clustering 306 procedure produces the probability of each phrase belonging to a particular cluster (causal map node), and a corresponding directed, weighted graph (i.e., causal map generation 308) which is used to obtain the causal connection between nodes. The weights in the graph represent the connection strengths between individual cause-effect phrases, which depend on their respective clustering assignments. The graph is pruned based on the edge weights and node priors to construct the final causal map.

(3.1) Cause-Effect Extraction 302

In one embodiment, all semantic cause-effect pairs are extracted from each document in the multi-document text corpus input 300 using DeepCx 310 (see Literature Reference No. 7), which is a Long Short-Term Memory (LSTM) network. The extracted pairs are represented as triples containing the cause phrase, causal connective, and effect phrase. For example, the sentence "you must notify your lender if you are unable to make payments" would be parsed as (you are unable to make payment, if, you must notify your lender).

(3.2) Phrase Embedding 304

The Universal Sentence Encoder 312 (see Literature Reference No. 8) is used to embed each of the cause-and-effect phrases. USE defines a function Emb from raw-text into $\mathbb{R}^{512}$, such that all of the 512-dimensional output vectors have unit norm. This embedding makes possible a similarity measure between any two phrases, $p_1$, $p_2$ given by the inner-product of their respective embeddings:

$$\text{sim}(p_1, p_2) = \text{Emb}(p_1) \cdot \text{Emb}(p_2). \quad (1)$$

USE was chosen because it natively encodes sentence-level semantic meaning, with performance on par with state-of-the-art methods (see Literature Reference No. 9). The extracted cause-effect pairs cannot be used as is to construct the causal map due to the number of distinct phrases and the size of the corresponding causal map. The rest of the pipeline focuses on creating a valid abstraction of this causal knowledge which is both human-interpretable, and generalizable to new documents.

(3.3) Clustering Embeddings 306

Using the phrase embeddings 304 and similarity as a distance measure, the pairs of cause-and-effect phrases are clustered simultaneously by estimating the edge weight of their causal relationship in conjunction with their cluster memberships. This is accomplished via a modification of the Poisson kernel clustering methods proposed in Literature Reference No. 14, which enables the modeling of links across clusters. Specifically, the resulting embedded vectors from the phrase embedding 304 are clustered using a mixture model 314 over the collection of cause-effect embedding pairs in order to attain probabilities of cluster pair assignments for each embedded vector and prior probabilities associated with cluster pairings. Additional details regarding the clustering process are provided below.

(3.4) Causal Map Generation 308

At this stage of the pipeline, a fully-connected weighted graph has been created. In order to produce an interactive, human-understandable causal map, some of the edges need to be pruned. To this end, edges with a value below an empirically derived threshold $\tau$ are removed. Under this scheme, the probabilistic nature of the clustering method provides an interpretation for the remaining edges: the probability of a cause-effect pair occurring in any of the relationships in this graph is bounded below by $\tau$. To assign labels to concept nodes and edges, the probabilistic nature of the graph is utilized by selecting the maximally probable phrases (i.e., probabilistic extraction 316), as described below.

(3.5) Cause-Effect Clustering

When deriving causal maps, it is assumed that there exist latent concepts of which the given corpus provides instances. Moreover, it is assumed that the corpus is expressing some latent causal relationships between concepts. This acts as motivation for the model according to embodiments of the present disclosure, which aims to describe both the structure of the concepts and the structure of the concept links as a joint probability distribution over the embedding space.

Figure 4A:
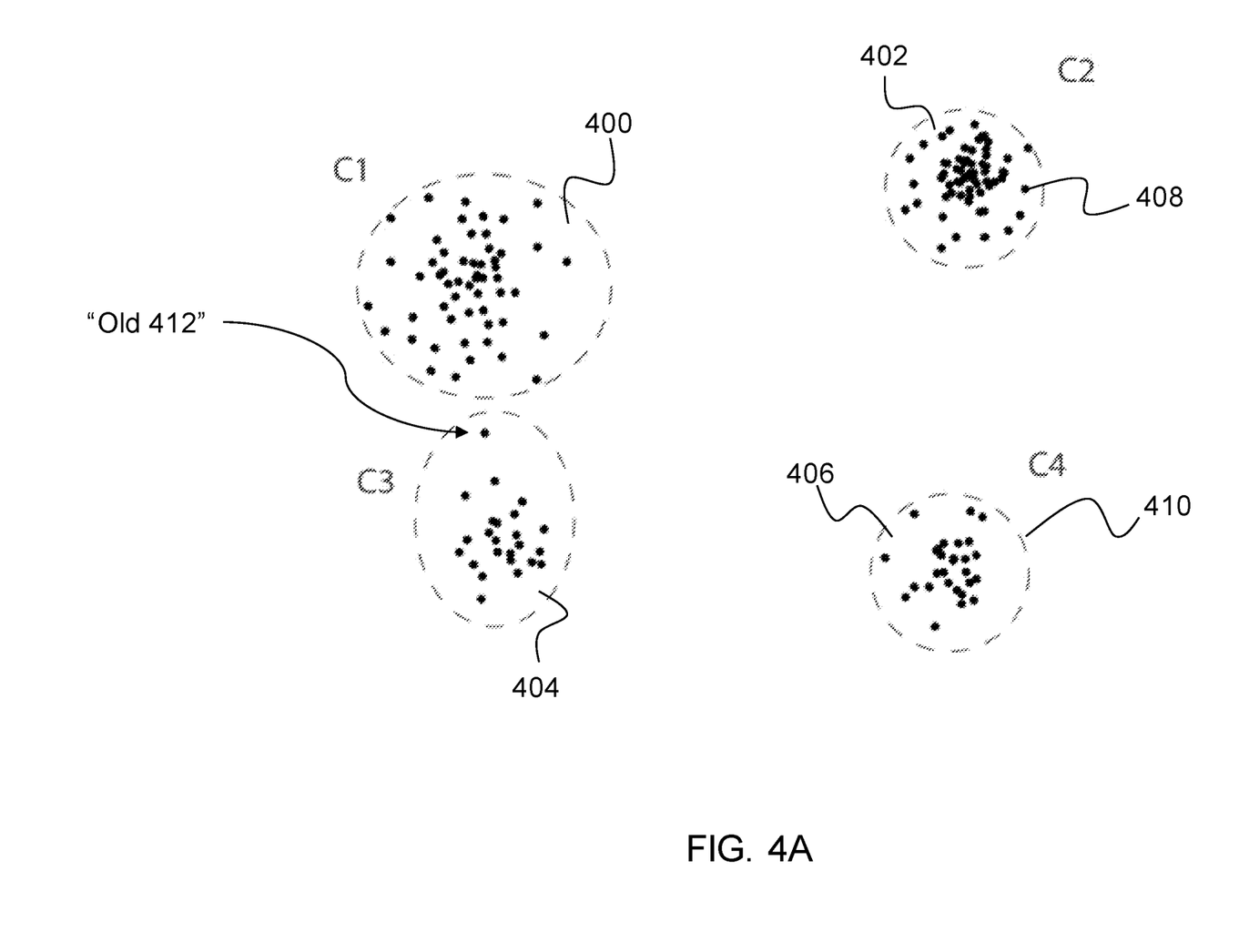
FIG. 4A is an illustration of concepts derived from a concept model which ignores links to according to some embodiments of the present disclosure.
Figure 4B:
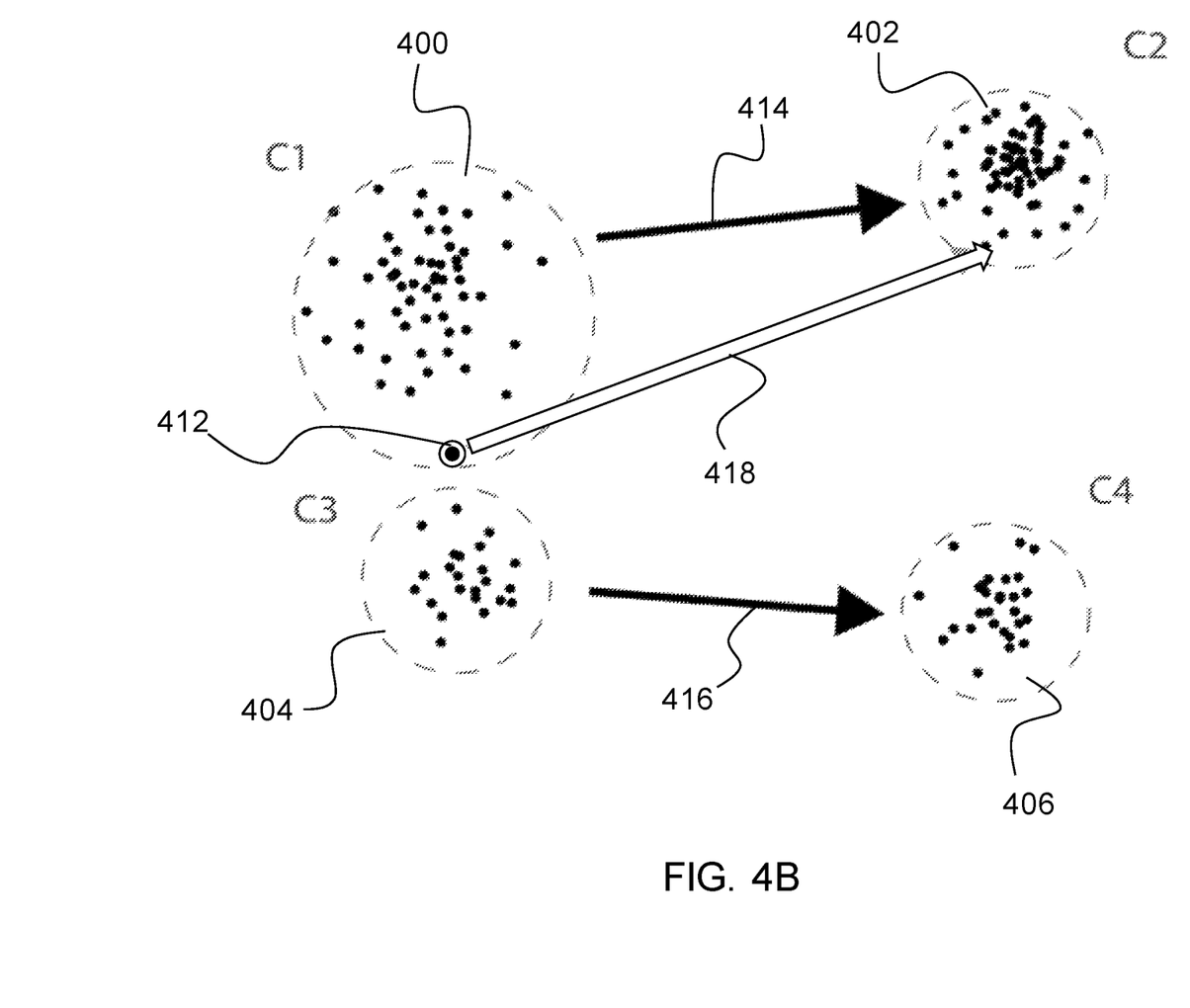
FIG. 4B is an illustration of concepts derived from a model which considers links according to some embodiments of the present disclosure.

The invention described herein not only provides a more complete model of the latent structure, but also produces more coherent concepts as compared to methods which models concepts and links separately. FIGS. 4A and 4B illustrate the benefits of considering the cause-effect links when modeling concepts. FIG. 4A depicts concepts derived from a concept model which ignores links, while FIG. 4B depicts concepts derived from a model which considers links. C1 400, C2 402, C3 404, and C4 406 represent the estimated concepts in two cases.

Referring to FIG. 4A, each point (e.g., 408) represents an embedding of a single cause or effect phrase, and the dashed lines (e.g., 410) represent the modeled concepts. A model which ignores the cause-effect structure of the data (e.g., by clustering the embedded phrases independently) may produce concepts of the form depicted in FIG. 4A. As can be seen in FIG. 4A, this model assigns the indicated point 412 to C3. However, consider a scenario in which the majority of causes in C1 400 have effects that lie in C2 402. As shown in FIG. 4B, the method described herein uses that evidence to assign the outlined point 412 (whose effect lies in C2 402) to concept C1 400 instead of C3, thereby creating more coherent causal concepts. Arrows 414 and 416 represent links between the concept instance of the data points (dots) and arrow 418 represents the link between the outlined point 412 and a point in C2 402.

If N denotes the number of cause-effect phrase pairs extracted from the input document (i.e., cause-effect extraction 302), there are tuples of strings ($C_i$, $\text{Con}_i$, $E_i$) containing the cause, connective phrase, and effect, respectively, for i=1, . . . , N. The cause-and-effect embeddings are unit vectors (i.e., embedded vectors) denoted by $c_i = \text{Emb}(C_i)$ and $e_i = \text{Emb}(E_i)$ for all values of i. Therefore, there is a collection $D = \{(c_1, e_1), \ldots, (c_N, e_N)\}$ for $c_i, e_i \in S^{d-1}$, where $S^{d-1} \subset \mathbb{R}^d$ denotes the unit sphere, and it is assumed that the pairs ($c_i$, $e_i$) are independent and identically distributed samples from a mixture distribution. dis determined by the dimensionality of the embedding space. In one embodiment, the Universal Sentence Encoder, which has an embedding dimension of d=512, is used.

For simplicity, denote $x_i = [c_i, e_i]$, $x_i^1 = C_i$ and $x_i^2 = e_i$. It is assumed that there are K concepts. This induces $K^2$ links between concepts, which are modeled with corresponding latent link indicator variables $Z_i \in [1, K]^2$ for i=1, . . . , N, where $[1, K]^2$ is the set of ordered pairs (a,b) where (a,b) are each any integer between 1 and K. $Z_i$ is the latent indicator variable corresponding to the ith observation. It is assumed these are independent with $P(x_i | Z_i = (a, b)) = f(c_i; \theta_a) f(e_i; \theta_b)$ for probability density function (PDF) $f$ and parameters $\theta_j$ for j=1, . . . , K. Finally, there are priors $P(Z_i = (a, b)) = \alpha_{ab}$.

For the PDF $f$, take $$f(y; \theta_j) = \frac{1 - p_j^2}{w_d \|y - p_j \mu_j\|^d} \quad (2)$$

where $\theta_j = (p_j, \mu_j)$, $p_j \in (0, 1)$, $\mu_j \in S^{d-1}$, and $w_d = 2\pi^{d/2}(\Gamma(d/2))$ is the surface area of the unit sphere in $\mathbb{R}^d$, p is a number between 0 and 1, $\mu_j$ is a unit vector, and the index j ranges from 1 to K, and (p,u) denotes an ordered pair. This PDF is chosen because it is only dependent on the original phrase through its similarity with the latent mean phrase of cluster j. Additionally, mixture models 314 using the above distribution have been shown to perform on par with other state-of-the-art methods for clustering on the sphere, with the additional benefit that the difficulty of parameter estimation is greatly reduced (see Literature Reference No. 10). In order to estimate all of the above parameters, denoted by $\Theta = \{\theta\} \cup \{\alpha\}$, and apply the popular iterative procedure known as the Expectation Maximization (EM) algorithm (see Literature Reference No. 11) to obtain the maximum likelihood estimate for $\Theta$.

(3.6) Causal Map Generation 308

Once the maximum likelihood estimate of the parameters $\Theta$ has been determined, the causal map is derived as follows. At the start of the pruning process, each of the K clusters represents one concept node in the fully connected, bidirectional causal map. The directed connection from node a to node b is retained only if the probability of the connection between them is above a threshold $\tau$ (i.e., if $P(Z = (a, b) | Z^1 = a)$ >τ for some chosen threshold τ∈[0,1]. The threshold τ can be determined empirically by seeking connection strengths which are relatively high compared to all other connections starting at a. This process is repeated for all bidirectional graph links. Here, Z is the latent indicator variable corresponding to an arbitrary observation.

In order to select a phrase with which to label each node, look for the phrase embedding $x_i$, which is maximally probable for that cluster (i.e., if $(i, t)=\text{argmax}_{(i,t)}P(x_i|Z_i^t=j)$, the label for concept j is given by the raw text that $x_i^t$ represents. Similarly, the label for the directed edge connecting the concept a to b is given by the associated (maximally probable) causal connective phrase, $\text{Con}_i$, where $i=\text{argmax}_i P(x_i|Z_i=(a, b))$.|

Figure 5:
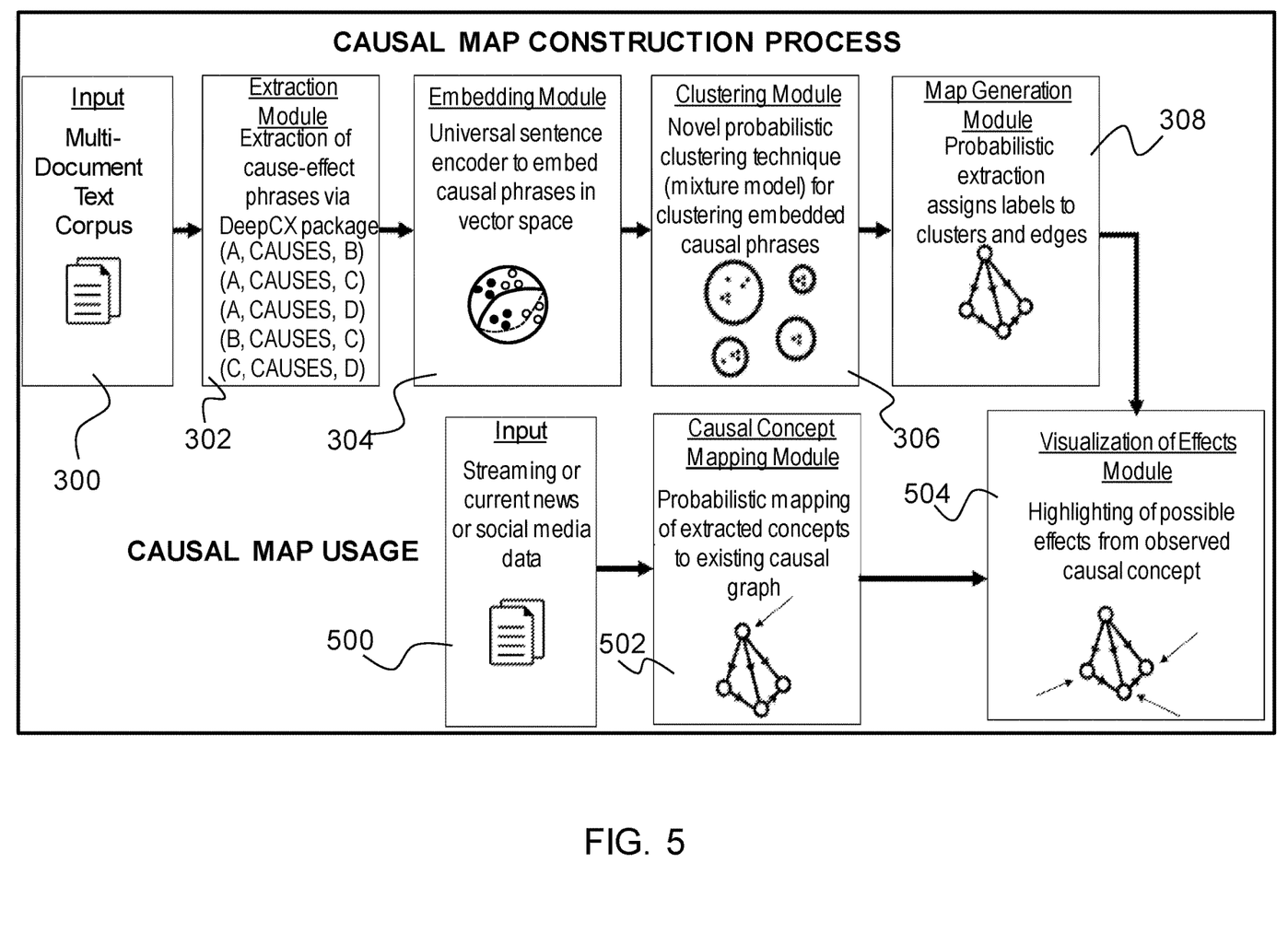
FIG. 5 is an illustration of the causal map generation and usage processes according to some embodiments of the present disclosure.

FIG. 5 illustrates an overview of the causal map generation and usage processes according to embodiments of the present disclosure. As described above, during the Causal Map Usage process, the user collects documents related to current events and feeds them into the system as input 500. The tool extracts causal concepts and relationships from these new documents and maps them (via the Causal Concept Mapping Module 502) to the existing (historical) causal map created during the Causal Map Construction process. The Causal Concept Mapping Module 502 uses a probabilistic mapping method. The tool is able to provide the user with the maximum likelihood mapped concepts that the user is able to interact with (e.g., confirm/deny/update identified mappings). Once mapped, the tool highlights the portions of the causal map relevant to the current events of interest for prediction of future events (i.e., the Visualization of Effects Module 504). Highlighting refers to visually depicting the relevant effects of the events, such as changing font style (e.g., color, size, typeface) of the corresponding effect and/or changing the visual style of the corresponding node representing the effect.

(3.7) Results and Analysis

The method according to embodiments of the present disclosure was compared against the state-of-the-art method described in Literature Reference No. 3, which is referred to as Coref. This is a supervised method which extracts phrases using OpenIE-4 and aims to first identify all pairs of phrases which refer to the same concept. This is treated as a binary classification problem and, as such, a logistic regression model was applied using as input both lexical and semantic features of the phrases. Once trained, the outputs of the classification are used to partition the entire input set into concepts. After assigning labels to the concepts and concept links, each concept is scored based on a weighted combination of over thirty features relating to the phrases captured by the concept, the label representing the concept, and the position of the concept within the graph. Finally, the concept map is extracted by finding a connected subgraph which maximizes the total concept score.

As a baseline, TextRank (see Literature Reference No. 12) was implemented. TextRank is a text summarization methodology which, given a desired summarization size K, is intended to produce a list of the best K phrases to summarize the input text. This is done by applying a graphical optimization scheme in which the nodes are phrases and the edges are weighted using a distance measure between all pairs of phrases. While this is not a concept map creation tool, the phrases it produces can still reasonably be used as a baseline to compare against the phrases produced by the present invention. In order to make a fair comparison, the same input phrases as the method described herein were used, and $$\frac{1}{2} - \frac{sim}{2}$$

(where sim is defined by (1)) as the distance metric.

Figure 6:
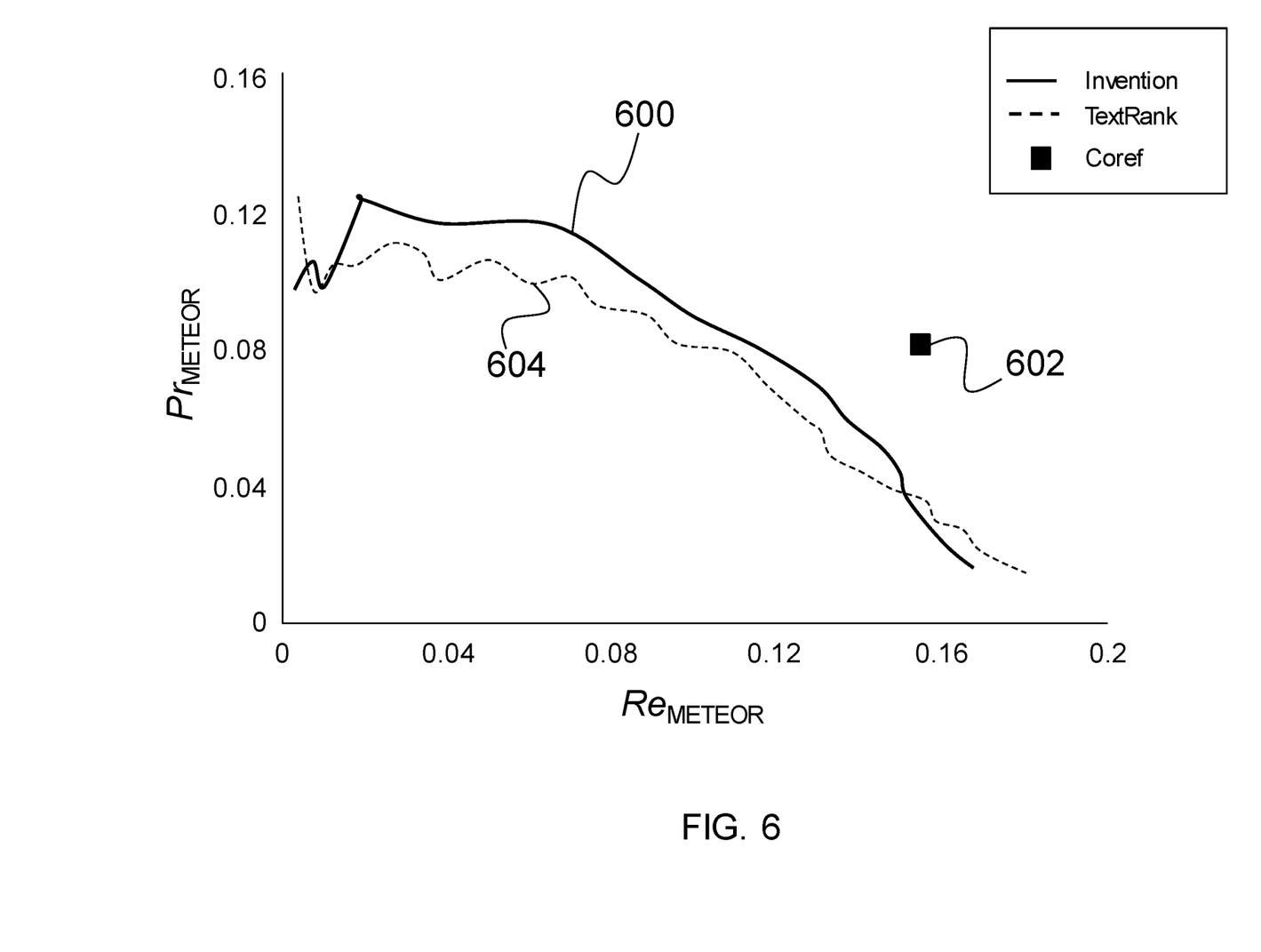
FIG. 6 is an illustration of a Metric for Evaluation of Translation with Explicit Ordering (METEOR) precision/recall curve according to some embodiments of the present disclosure.

FIG. 6 shows a plot of the METEOR (Metric for Evaluation of Translation with Explicit Ordering) precision vs. recall (see Literature Reference No. 15 for a description of METEOR). The curve for the model described herein (represented by solid line 600) was produced by varying the number of sentences used in summarization between 1 and 300. Only a single point is shown for Coref (represented by square 602) because there is no clear tuning parameter in this case. It is clear from FIG. 6 that the method described herein (represented by solid line 600) performs at least as well as the baseline Textrank (represented by dashed line 604); however, it appears to underperform relative to Coref (represented by square 602). This is not entirely surprising given that Coref is a fully supervised method whereas the method described herein is unsupervised. Because ground-truth concept maps are laborious to generate and sparse in number, it is believed that the benefits of having an unsupervised method warrant the compromise in performance. Also note that the performance of Coref may be inflated because the methodology was designed specifically to produce optimal results on the Falke17 dataset used to generate 600 and 604.

(3.8) Qualitative Results

As a qualitative example of how the methodology of the present invention might be implemented, we consider the NELA2019 dataset (see Literature Reference No. 13). The NELA2019 dataset is comprised of over a million English news articles from 260 news sources published in the year 2019. This dataset provides a larger and more realistic scenario for a concept map product as compared to Falke17; however, NELA2019 is not amenable to quantitative evaluation because corresponding reference maps do not currently exist.

Figure 7:
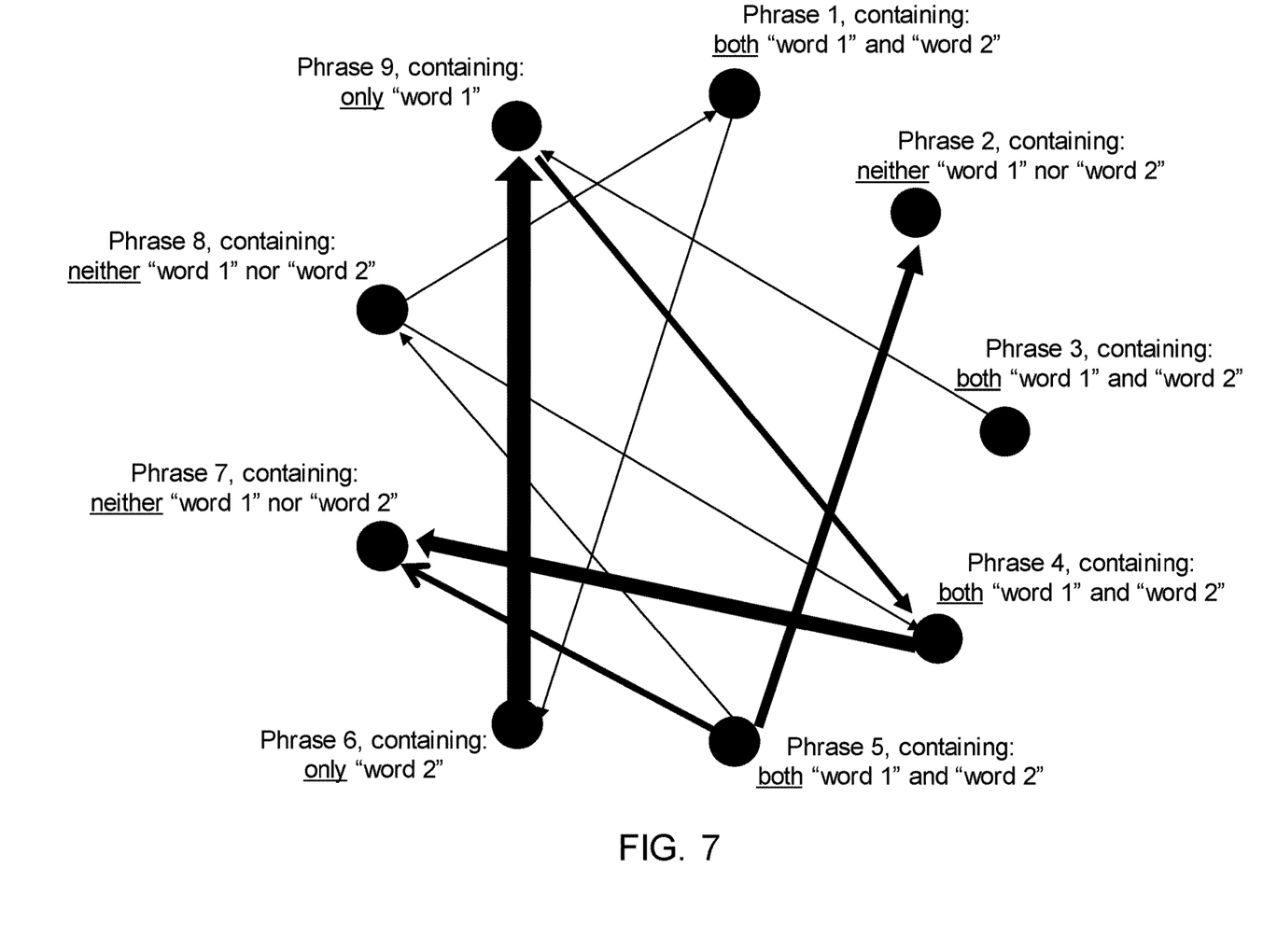
FIG. 7 schematically illustrates an automatically generated causal map according to some embodiments of the present disclosure.

In order to generate cause-effect pairs related to a chosen topic, only articles within an appropriate time period, such as a time-frame of which it is believed that the most news coverage about an event occurred, may be considered. For example, only articles between January and March 2019 may be. Then, articles containing less than a given number of words (200, for example) are removed, since it is expected that larger articles contain more substantial causal language. After extracting causal phrases, all pairs which did not contain words of interest (for example, 2 words of interest "word 1" and "word 2") are removed. This procedure provides an input of causal pairs from news articles to the clustering step. The methodology described herein is then applied with both the cluster number and edge threshold manually set for interpretability. The results are schematically shown in FIG. 7, where the edge-widths indicate the magnitude of the link priors, the edge labels have been removed for ease of readability, and the results focus on 2 words of interest ("word 1" and "word 2"). It is clear from FIG. 7 that many causal relationships are represented.

In summary, the present invention addresses the problem of generating causal maps from text data. A framework for generating causal maps which utilizes a unique mixture model to simultaneously model concepts and links is described. The utility of the approach was both quantitatively validated against manually created concept maps from a diverse corpus and qualitatively evaluated using a large collection of news articles. It was shown that the method according to embodiments of the present disclosure performs at least as well as a common text summarization methodology and has performance comparable to the state-of-the-art supervised method.

The system is a decision-making tool that can be useful in various application areas depending on what genre of text documents are fed into it to create the initial causal map. Non-limiting examples of predictions that can be output by this system can be financial in nature (e.g., stock market or economic event prediction) or geopolitical (e.g., prediction of events from one setting to another). For example, in the realm of finance, one could consider applying the model to transactional data, where each node represents an entity and each directed edge represents a transaction. The clustering procedure would provide insight into the structure of a given entity, which could be used by companies to inform the transactional behavior of key market demographics. Because the mixture model is readily amenable to clustering new data, its application to transactional data could also be leveraged as a tool for fraud detection by flagging entities which are clustered with known fraud cases. The main requirement is that the cause-effect concepts and relationships initially derived by the system during the tool's construction process are able to be mapped to cause-effect concepts which are realized in the input data stream.

Figure 8A:
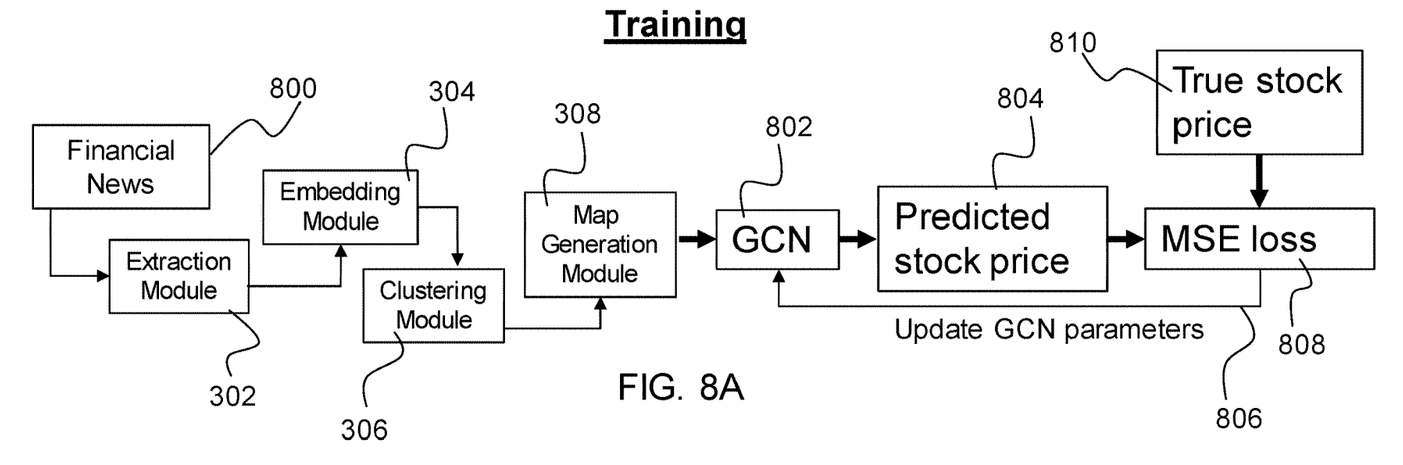
FIG. 8A is an illustration of training of the system according to embodiments of the present disclosure with financial input data.
Figure 8B:
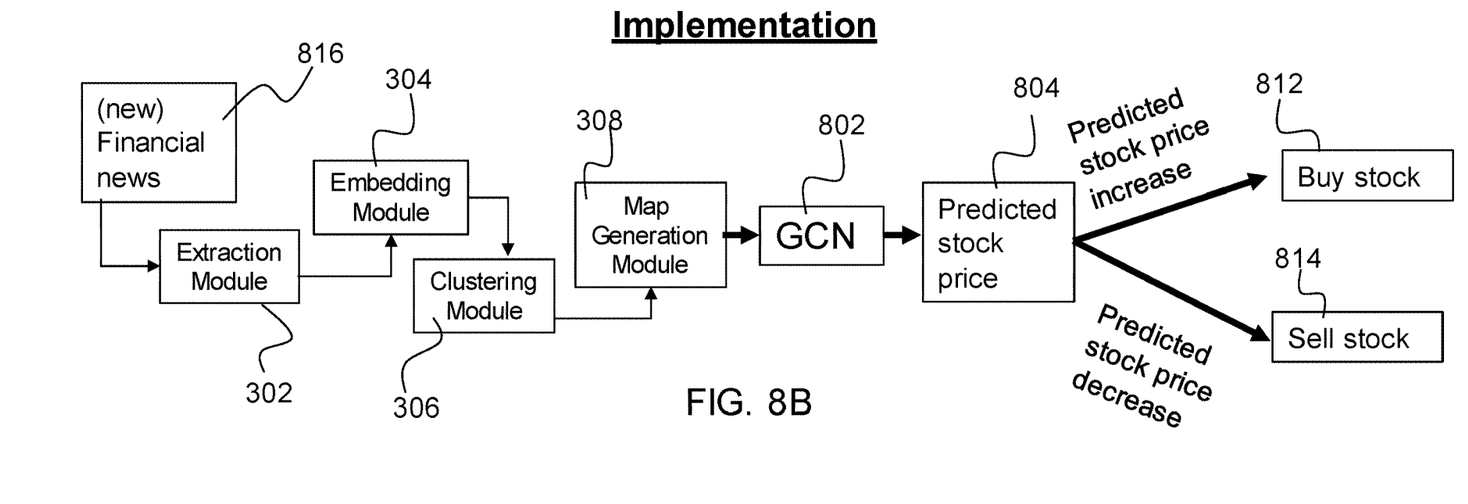
FIG. 8B is an illustration of implementation of the system trained in FIG. 8A according to embodiments of the present disclosure to make financial predictions.

Because causal relationships are exactly those that cause events to occur, a knowledge graph, such as the one depicted in FIG. 7, may be used to aid temporal prediction for any event of interest as long as the domain-relevant textual documents exist. For example, as shown in FIG. 8A, financial news data 800 may be input into the system to generate a causal graph depicting the causal interactions between economically pertinent entities. Given historical stock price and financial news data 800, one may train a graph convolutional network (GCN) 802 with the generated causal maps as input in order to predict the future stock price(s) 804 as the output. Specifically, the GCN 802 would operate on the causal graph with the node features being the use embedding of the corresponding concept phrase in the causal graph. The parameters of the GCN 806 may be trained via gradient descent using a mean squared error loss 808 between the true stock price 810 and the predicted stock price 804. FIG. 8B depicts implementation of the pipeline trained in FIG. 8A. The pipeline may be used to automatically buy and sell stocks 812 and 814 based on current financial news 816 and the corresponding predicted future stock price(s) 804.

Figure 9:
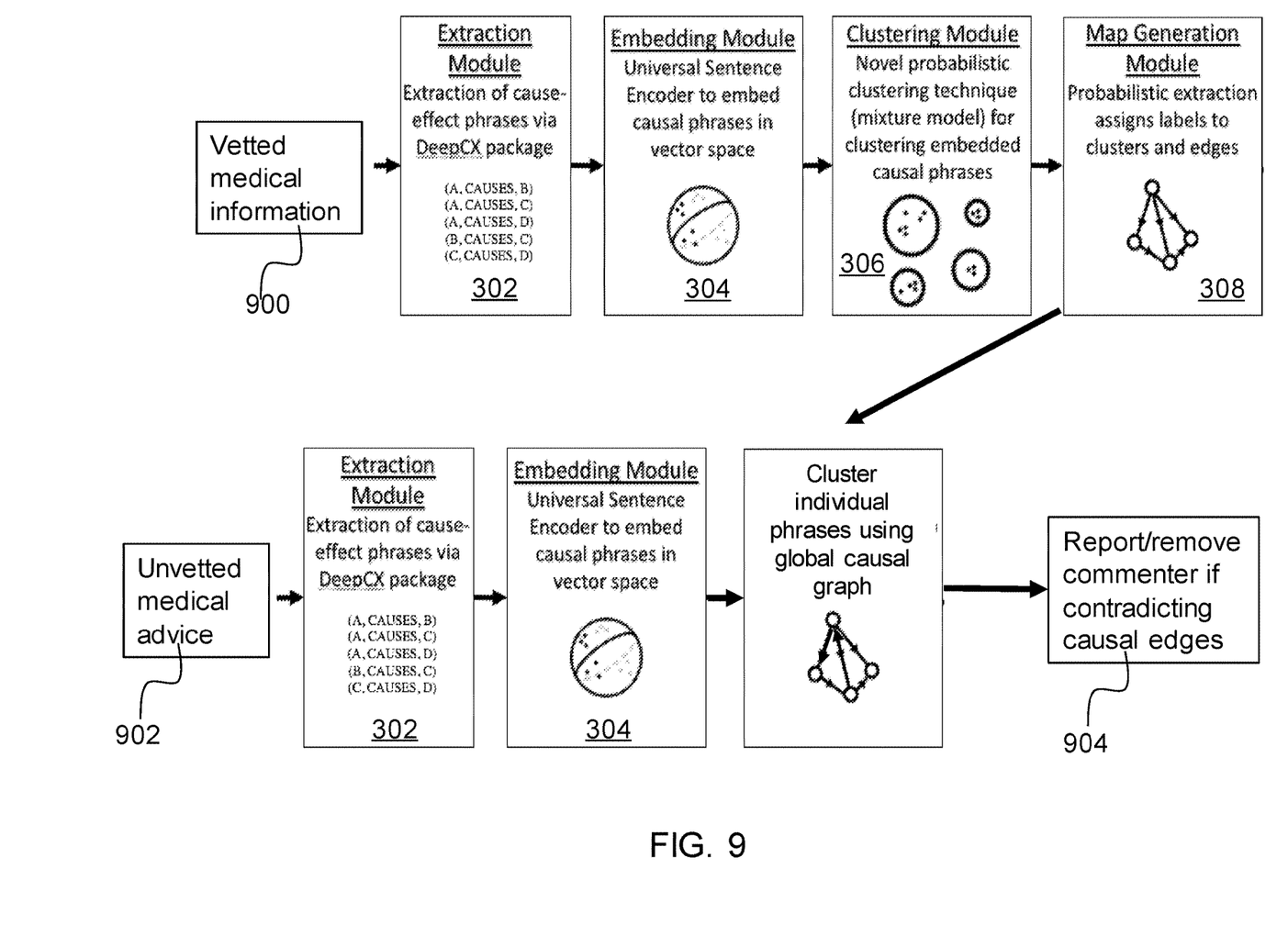
FIG. 9 is an illustration of automatic detection of inaccurate causal statements according to some embodiments of the present disclosure.

Another possible application is in the automatic detection of inaccurate causal statements. For example, as illustrated in FIG. 9, given a large collection of vetted medical text information 900 (parsed from textbooks, papers, vetted websites), the method described herein may be used to generate a global medical causal graph. Then, given a piece of unvetted medical information 902, such as medical advice from Reddit, one could generate the corresponding causal phrase embeddings using this pipeline and assign each cause/effect to its corresponding highest probability cluster in the global causal graph. If the new cause/effect pairs contain any edges not currently in the global causal graph, the comment can be assumed to contain inaccurate causal medical information and be subsequently reported or removed 904.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for producing a causal map from a body of text describing observed events, the system comprising:
one or more processors and a non-transitory computer-readable medium having executable instructions encoded thereon such that when executed, the one or more processors perform operations of:
receiving a plurality of textual documents as input;
extracting pairs of cause-effect phrases from the plurality of textual documents;
embedding the cause-effect phrases into a vector space, resulting in embedded data;
clustering the embedded data into a plurality of clusters using a probabilistic technique;
generating a causal map, comprising a plurality of nodes and edges, from the plurality of clusters;
using the causal map, obtaining causal connections between clusters, wherein each node represents an event and each edge represents a causal relationship between events; and
providing the causal map as an interactive graph.

2. The system as set forth in claim 1, wherein the probabilistic technique generates a set of probabilities for both the plurality of clusters and any linkages between the clusters.

3. The system as set forth in claim 2, where in clustering the embedded data, the one or more processors perform an operation of using a mixture model to generate the set of probabilities and a plurality of prior probabilities associated with the plurality of clusters.

4. The system as set forth in claim 1, wherein extracting pairs of cause-effect phrases comprises extracting semantic cause-effect phrases from each textual document, wherein each cause-effect phrase comprises a cause phrase, a causal connective, and an effect phrase.

5. The system as set forth in claim 4, wherein the semantic cause-effect phrases are embedded into the vector space such that a similarity between semantic cause-effect phrases is represented by an inner product between vectors corresponding to the semantic cause-effect phrases.

6. The system as set forth in claim 1, wherein the one or more processors further perform operations of:
extracting causal language from a set of new documents related to current events;
mapping the extracted causal language from the set of new documents to the causal map to update the causal map;
outputting an updated causal map; and
highlighting areas of the updated causal map which display effects of the current events.

7. The system as set forth in claim 1, wherein the one or more processors further perform an operation of generating predictions of effects of the observed events using the interactive graph.

8. The system as set forth in claim 1, wherein the one or more processors further perform an operation of detecting inaccurate causal statements in the textual documents using the interactive graph.

9. A computer program product producing a causal map from a body of text describing observed events, the computer program product comprising:
a non-transitory computer-readable medium having executable instructions encoded thereon, such that upon execution of the instructions by one or more processors, the one or more processors perform operations of:
receiving a plurality of textual documents as input;
extracting pairs of cause-effect phrases from the plurality of textual documents;
embedding the cause-effect phrases into a vector space, resulting in embedded data;
clustering the embedded data into a plurality of clusters using a probabilistic technique;
generating a causal map, comprising a plurality of nodes and edges, from the plurality of clusters;
using the causal map, obtaining causal connections between clusters, wherein each node represents an event and each edge represents a causal relationship between events; and
providing the causal map as an interactive graph.

10. The computer program product as set forth in claim 9, wherein the probabilistic technique generates a set of probabilities for both the plurality of clusters and any linkages between the clusters.

11. The computer program product as set forth in claim 9, wherein the cause-effect phrases are embedded into the vector space such that a similarity between cause-effect phrases is represented by an inner product between vectors corresponding to the cause-effect phrases.

12. The computer program product as set forth in claim 9, further comprising instructions for causing the one or more processors to perform operations of:
extracting causal language from a set of new documents related to current events;
mapping the extracted causal language from the set of new documents to the causal map to update the causal map;
outputting an updated causal map; and
highlighting areas of the updated causal map which display effects of the current events.

13. A computer implemented method for producing a causal map from a body of text describing observed events, the method comprising an act of:
causing one or more processors to execute instructions encoded on a non-transitory computer-readable medium, such that upon execution, the one or more processors perform operations of:
receiving a plurality of textual documents as input;
extracting pairs of cause-effect phrases from the plurality of textual documents;
embedding the cause-effect phrases into a vector space, resulting in embedded data;
clustering the embedded data into a plurality of clusters using a probabilistic technique;
generating a causal map, comprising a plurality of nodes and edges, from the plurality of clusters;
using the causal map, obtaining causal connections between clusters, wherein each node represents an event and each edge represents a causal relationship between events; and
providing the causal map as an interactive graph.

14. The method as set forth in claim 13, wherein the probabilistic technique generates a set of probabilities for both the plurality of clusters and any linkages between the clusters.

15. The method as set forth in claim 14, where in clustering the embedded data, the one or more processors perform an operation of using a mixture model to generate the set of probabilities and a plurality of prior probabilities associated with the plurality of clusters.

16. The method as set forth in claim 13, wherein extracting pairs of cause-effect phrases comprises extracting semantic cause-effect phrases from each textual document, wherein each cause-effect phrase comprises a cause phrase, a causal connective, and an effect phrase.

17. The method as set forth in claim 16, wherein the semantic cause-effect phrases are embedded into the vector space such that a similarity between semantic cause-effect phrases is represented by an inner product between vectors corresponding to the semantic cause-effect phrases.

18. The method as set forth in claim 13, wherein the one or more processors further perform operations of:
extracting causal language from a set of new documents related to current events;
mapping the extracted causal language from the set of new documents to the causal map to update the causal map;
outputting an updated causal map; and
highlighting areas of the updated causal map which display effects of the current events.

19. The method as set forth in claim 13, wherein the interactive graph is used to predict effects of the observed events.

20. The method as set forth in claim 13, wherein the interactive graph is used to detect inaccurate causal statements in the textual documents.

* * * * *